US012218850B2

(12) United States Patent
Huang et al.

(10) Patent No.: US 12,218,850 B2
(45) Date of Patent: Feb. 4, 2025

(54) TRANSMISSION RATE MANAGEMENT METHOD AND DEVICE

(71) Applicant: MEDIATEK INC., Hsinchu (TW)

(72) Inventors: Yuan-Ting Huang, Hsinchu (TW); Kai-Wen Liu, Hsinchu (TW); Yu-Hua Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 356 days.

(21) Appl. No.: 17/587,028

(22) Filed: Jan. 28, 2022

(65) Prior Publication Data

US 2023/0246974 A1 Aug. 3, 2023

(51) Int. Cl.
*H04L 47/25* (2022.01)

(52) U.S. Cl.
CPC .................................. *H04L 47/25* (2013.01)

(58) Field of Classification Search
CPC ....................................................... H04L 47/25
See application file for complete search history.

(56) References Cited

U.S. PATENT DOCUMENTS

| 6,144,639 | A * | 11/2000 | Zhao | .................. | H04L 12/5602 |
| | | | | | 370/235 |
| 2006/0194585 | A1* | 8/2006 | Usuda | .................. | H04W 28/22 |
| | | | | | 455/560 |
| 2007/0121666 | A1* | 5/2007 | Kim | .................... | H04W 52/346 |
| | | | | | 370/335 |
| 2019/0238438 | A1 | 8/2019 | Hassan et al. | | |

FOREIGN PATENT DOCUMENTS

CN 105577573 B 3/2020

OTHER PUBLICATIONS

Chinese language office action dated Nov. 28, 2022, issued in application No. TW 111111222.

* cited by examiner

*Primary Examiner* — Brenda H Pham
(74) *Attorney, Agent, or Firm* — McClure, Qualey & Rodack, LLP

(57) ABSTRACT

A transmission rate management method is provided. The transmission rate management method is applied to a transmission rate management device. The transmission rate management method includes the steps of calculating a total available data traffic of the transmission rate management device based on a data plan for the transmission rate management device, wherein the total available data traffic corresponds to a period of time; allocating to each of one or more client devices currently connected to the transmission rate management device one available data traffic corresponding to the period of time according to the total available data traffic; and adjusting a transmission rate of a client device of the one or more client devices based on a remaining data traffic of the available data traffic of the client device.

18 Claims, 2 Drawing Sheets

TRANSMISSION RATE MANAGEMENT METHOD AND DEVICE

BACKGROUND OF THE INVENTION

Field of the Invention

The invention generally relates to transmission rate management technology, and more particularly, to transmission rate management technology in which the data traffic for each client device can be allocated based on the data plan and the number of client devices.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In a 5G limited data plan, if users of client devices use the internet without restraint, they may run out of data traffic before the end day of the metering period of the data plan. It will cause a bad user experience of surfing the internet during the rest of the metering period. Therefore, users who rent a Mi-Fi (or mobile Wi-Fi) with a 5G limited data plan may worry about running out of data traffic provided in the data plan when they go abroad.

In one current solution to the above problem, the operator or application providing the data plan may send a notification when users are going to run out of data traffic provided in the data plan. However, this solution is just a passive notification and cannot help users limit their transmission rate to prevent them from actively running out of data traffic.

In another current solution, the transmission rate may be limited by the router. Specifically, users may pre-set a fixed transmission rate and they only can use the fixed transmission rate every day in the metering period of the data plan. However, this solution is not flexible, and as a result, users may have bad user experience of surfing the network.

BRIEF SUMMARY OF THE INVENTION

A transmission rate management method and device are provided to overcome the problems mentioned above.

An embodiment of the invention provides transmission rate management method. The transmission rate management method is applied to a transmission rate management device. The transmission rate management method includes the steps of calculating a total available data traffic of the transmission rate management device based on a data plan for the transmission rate management device, wherein the total available data traffic corresponds to a period of time; allocating to each of one or more client devices currently connected to the transmission rate management device one available data traffic corresponding to the period of time according to the total available data traffic; and adjusting a transmission rate of a client device of the one or more client devices based on a remaining data traffic of the available data traffic of the client device.

An embodiment of the invention provides a transmission rate management device. The transmission rate management device includes a data traffic allocator and a transmission rate controller. The data traffic allocator may calculate a total available data traffic of the transmission rate management device based on a data plan for the transmission rate management device, wherein the total available data traffic corresponds to a period of time. In addition, the data traffic allocator may allocate to each of one or more client devices currently connected to the transmission rate management device one available data traffic corresponding to the period of time according to the total available data traffic. The transmission rate controller is coupled to the data traffic allocator. The transmission rate controller may adjust a transmission rate of each client device based on remaining data traffic of each client device.

Other aspects and features of the invention will become apparent to those with ordinary skill in the art upon review of the following descriptions of specific embodiments of the transmission rate management method and device.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
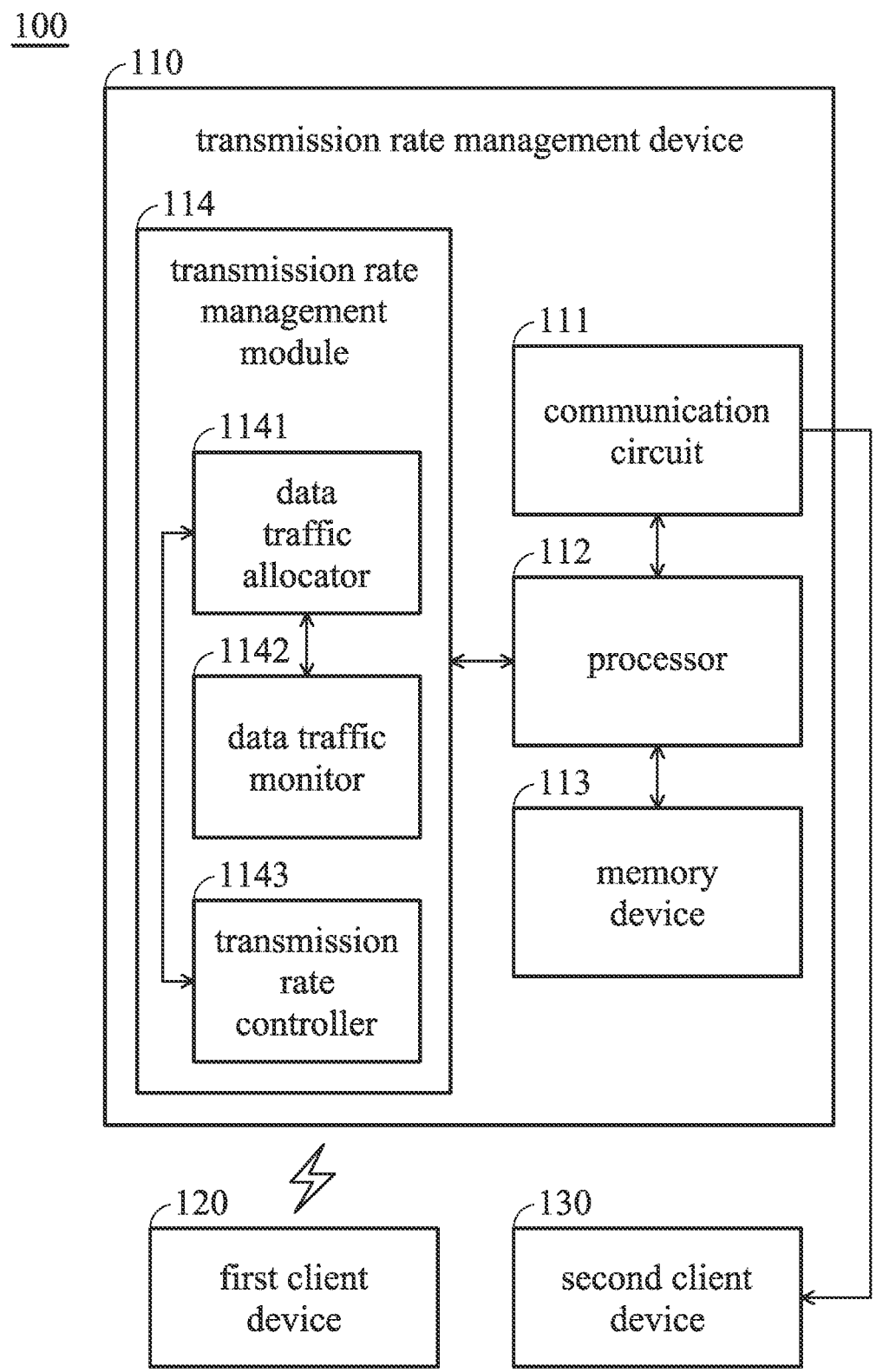
FIG. 1 is a block diagram of a transmission rate management system 100 according to an embodiment of the invention.

FIG. 1 is a block diagram of a transmission rate management system 100 according to an embodiment of the invention. As shown in FIG. 1, the transmission rate management system 100 includes a transmission rate management device 110, a first client device 120 and a second client device 130. It should be noted that in order to clarify the concept of the invention, FIG. 1 presents a simplified block diagram in which only the elements relevant to the invention are shown. However, the invention should not be limited to what is shown in FIG. 1. The transmission rate management system 100 may also comprise more client devices.

In the embodiments of the invention, the transmission rate management device 110 may provide the internet connection to the client devices (e.g. the first client device 120 and a second client device 130). The transmission rate management device 110 may be a router or an electronic device (e.g. a cell phone, a tablet computer, a notebook, but the invention should not be limited thereto) which has hotspot function to share its internet with other electronic devices. In the embodiments of the invention, the client device (e.g. the first client device 120 or the second client device 130) of the invention may be a cell phone, a tablet computer, a notebook, but the invention should not be limited thereto.

As shown in FIG. 1, the transmission rate management device 110 may include a communication circuit 111, a processor 112, a memory device 113 and a transmission rate management module 114. It should be noted that in order to clarify the concept of the invention, FIG. 1 presents a simplified block diagram in which only the elements relevant to the invention are shown. However, the transmission rate management device 110 should not be limited to what is shown in FIG. 1.

In the embodiments of the invention, the communication circuit 111 may comprise different network interfaces, e.g. wire network interface or wireless network interface. The wire network interface may comprise the Ethernet interface, but the invention should not be limited thereto. The wireless network interface may comprise Wi-Fi interface or Bluetooth interface, but the invention should not be limited thereto. The transmission rate management device 110 may be connected to the client devices through the communication circuit 111. In FIG. 1, the transmission rate management device 110 is connected to the first client device 120 through wireless communication technology (i.e. through the wireless network interface) and connected to the second client device 130 through wire communication technology (i.e. through the wire network interface), but the invention should not be limited thereto.

In the embodiments of the invention, the processor 112 may control the operations of the communication circuit 111, the memory device 113 and the transmission rate management module 114. According to an embodiment of the invention, the processor 112 may also be arranged to execute the program codes of the software modules. The program codes accompanied by specific data in a data structure may also be referred to as a processor logic unit or a stack instance when being executed. Therefore, the processor 112 may be regarded as being comprised of a plurality of processor logic units, each for executing one or more specific functions or tasks of the corresponding software modules.

In the embodiments of the invention, the memory device 113 may store the software and firmware program codes, system data, user data, etc. of the transmission rate management device 110. The memory device 113 may be a volatile memory such as a Random Access Memory (RAM); a non-volatile memory such as a flash memory or Read-Only Memory (ROM); a hard disk; or a combination thereof.

In the embodiments of the invention, the transmission rate management module 114 may comprise a data traffic allocator 1141, a data traffic monitor 1142, and a transmission rate controller 1143. The transmission rate management module 114 can be implemented and configured by hardware, firmware, software, and any combination thereof. The transmission rate management module 114, when executed by the processor 112 (e.g., via executing program codes stores in memory device 113), allow the transmission rate management device 110 to perform embodiments of the present invention.

According to an embodiment of the invention, the data traffic allocator 1141 may calculate a total available data traffic corresponding to a period of time based on a data plan. Further, the data traffic allocator 1141 may also calculate a total available backup data traffic corresponding to the period of time based on the data plan. The data plan may indicate how much data traffic can be used in the data plan and how long does the data plan last (i.e. the metering period of the data plan), e.g. in a data plan, 100 GB data traffic can be used and the data plan is valid for 30 days. The data plan may be pre-set in the transmission rate management device 110 by the administrator or user of the transmission rate management device 110. "The period of time" of the invention means a time base of the data traffic allocator 1141 calculating the total available data traffic and the total available backup data traffic. For example, the period of time could be 1 day, but the invention is not limited thereto. "The period of time" may be pre-set in the transmission rate management device 110 or selected by the user of the transmission rate management device 110 from the options shown in the transmission rate management device 110, but the invention should not be limited thereto. The data traffic allocator 1141 may calculate the total available data traffic and the total available backup data traffic corresponding to the period of time based on the data plan. For example, if in a data plan, 100 GB data traffic can be used, the data plan is valid for 30 days, and "the period of time" is 1 day, the data traffic allocator 1141 may set the total available data traffic is 3 GB per day (90 GB/30=3 GB) and the total available backup data traffic is 0.3 GB per day (10 GB/30=0.3 GB), i.e. 90% data traffic is allocated for the total available data traffic and 10% data traffic is allocated for the total available backup data traffic, but the invention should not be limited thereto. For another example, if in a data plan, 100 GB data traffic can be used, the data plan is valid for 30 days, and "the period of time" is 3 days, the data traffic allocator 1141 may set the total available data traffic is 9 GB per 3 days (90 GB/30*3=9 GB) and the total available backup data traffic is 0.9 GB per 3 days (10 GB/30*3=0.9 GB). It should be noted that the unit of "the period of time" of the invention is not limited to one or more days. It also can be one or more hours or other time units. The total available data traffic corresponding to the period of time and the total available backup data traffic corresponding to the period of time may be updated when the connection status of the client device is changed during the period of time. Details will be discussed below.

According to an embodiment of the invention, the data traffic allocator 1141 may allocate the available data traffic corresponding to the period of time and the available backup data traffic corresponding to the period of time to each client device currently connected to the transmission rate management device 110 based on the total available data traffic and the total available backup data traffic corresponding to the period of time. For example, it is assumed that the total available data traffic is 3 GB per day and the total available backup data traffic is 0.3 GB per day. If there is only one client device, such as the first client device 120, is connected to the transmission rate management device 110, the data traffic allocator 1141 may allocate 3 GB of available data traffic and 0.3 GB of available backup data traffic to the first client device 120.

According to an embodiment of the invention, the data traffic allocator 1141 may allocate the available data traffic according to the total available data traffic and the number of the client devices currently connected to the transmission rate management device 110. For example, it is assumed that the total available data traffic is 3 GB per day. If there are two client devices, such as the first client device 120 and the second client device 130, are connected to the transmission rate management device 110, the data traffic allocator 1141 may allocate 1.5 GB of available data traffic each to the first client device 120 and the second client device 130. Similarly, the data traffic allocator 1141 may allocate the available backup data traffic according to the total available backup data traffic and the number of the client devices currently connected to the transmission rate management device 110.

According to another embodiment of the invention, when the data traffic allocator 1141 allocate the available data traffic, the data traffic allocator 1141 may further concern the priority of each client devices connected to the transmission rate management device 110. The different priorities may correspond to different weights. For example, it is assumed that the total available data traffic corresponding to the period of time is 5 GB per day, the priority of the first client device 120 is 60 and the priority of the second client device 130 is 40. Therefore, the data traffic allocator 1141 may allocate 3 GB (5 GB*60/(60+40)) of available data traffic to the first client device 120 and allocate 2 GB (5 GB*40/(60+40)) of available data traffic to the second client device 130. Similarly, when the data traffic allocator 1141 allocate the available backup data traffic, the data traffic allocator 1141 may further concern the priority of each client devices connected to the transmission rate management device 110.

According to an embodiment of the invention, when a client device runs out of its available data traffic corresponding to the period of time during the period of time, the data traffic allocator 1141 may further allocate the available backup data traffic corresponding to the period of time to the client device. In another embodiment, the data traffic allocator 1141 may allocate the available data traffic and the available backup data traffic corresponding to the period of time to the client device at the same time. In addition, when the total available data traffic and the total backup data traffic have run out during the period of time, the data traffic allocator 1141 may not allocate any data traffic to any client device connected to the transmission rate management device 110 during the period of time.

According to an embodiment of the invention, the data traffic allocator 1141 may send the available data traffic and the available backup data traffic to the data traffic monitor 1142. The data traffic monitor 1142 may detect downlink traffic and uplink traffic of the client devices connected to the transmission rate management device 110 and monitor the remaining available data traffic and the remaining available backup data traffic for each client device connected to the transmission rate management device 110 during the period of time.

According to an embodiment of the invention, when the data traffic monitor 1142 monitors that a client device connected to the transmission rate management device 110 runs out of its available data traffic corresponding to the period of time, the data traffic monitor 1142 may send a first monitoring result to the data traffic allocator 1141. Then, in one embodiment, the data traffic allocator 1141 may indicate the transmission rate controller 1143 according to the first monitoring result to limit the transmission rate of the client device based on a first threshold, wherein the transmission rate of the client device may be regarded as the network speed or the internet speed when the client device using the data traffic provided by the transmission rate management device 110. In the embodiments of the invention, the first threshold can be a non-zero value. For example, the transmission rate of the client device may be limited to 1 Mbps. Next, when the data traffic monitor 1142 monitors that a client device connected to the transmission rate management device 110 also runs out of its available backup data traffic corresponding to the period of time, the data traffic monitor 1142 may send a second monitoring result to the data traffic allocator 1141. Then, the data traffic allocator 1141 may indicate the transmission rate controller 1143 according to the second monitoring result to limit the transmission rate of the client device based on a second threshold, wherein the second threshold is lower than the first threshold. For example, the transmission rate of the client device may be limited to 0 Mbps.

In another embodiment, the data traffic allocator 1141 allocate only the available data traffic without the available backup data traffic to a client service, and the data traffic allocator 1141 may indicate the transmission rate controller 1143 to limit the transmission rate of the client device directly to 0 Mbps based on the first monitoring result indicating the client device runs out of its available data traffic corresponding to the period of time.

In one embodiment, when the data traffic monitor 1142 sends the data traffic allocator 1141 the first monitoring result indicating that the client device connected to the transmission rate management device 110 has run out of its available data traffic corresponding to the period of time, the data traffic allocator 1141 may send a notification displayed on the client device to ask a user of the client device whether to agree with the transmission rate management device 110 limiting its transmission rate. If the user agrees with limiting its transmission rate, the data traffic allocator 1141 may indicate the transmission rate controller 1143 to limit the transmission rate of the client device, but the invention should not be limited thereto. In another embodiment, the data traffic allocator 1141 may directly indicate the transmission rate controller 1143 to limit the transmission rate of the client device without sending notification to the user of the client.

According to an embodiment of the invention, when the period of time is terminated, the data traffic allocator 1141 may calculate another total available data traffic and another total available backup data traffic for the next period of time. In one embodiment, the data traffic allocator 1141 may calculate another total available data traffic for the next period of time based on the data plan for the transmission rate management device 110 and a sum of remaining available data traffic corresponding to the period of time. Similarly, the data traffic allocator 1141 may calculate another total available backup data traffic for the next period of time based on the data plan for the transmission rate management device 110 and a sum of remaining available backup data traffic corresponding to the period of time. For example, the original total available data traffic corresponding to the period of time is 3 GB per day and the original total available backup data traffic corresponding to the period of time is 0.3 GB per day. When one day is terminated, in a case of one client device being connected to the transmission rate management device 110, 0.2 GB of available data traffic and 0.1 GB of available backup data traffic are left for the client device, i.e. the remaining available data traffic corresponding to this day is 0.2 GB and the remaining available backup data traffic corresponding to this day is 0.1 GB for the client device. The data traffic allocator 1141 calculate another total available data traffic by adding the original total available data traffic 3 GB per day to a sum of remaining available data traffic 0.2 GB to be 3.2 GB for the next day, and calculate another total available backup data traffic by adding the original total backup available data traffic 0.3 GB per day to a sum of remaining available backup data traffic 0.1 GB to be 0.4 GB for the next day. And then the data traffic allocator 1141 may allocate the another total available data traffic and the another total available backup data traffic as the method disclosed above.

In the embodiments of the invention, the initial time of each period of time of the invention may be pre-set in the transmission rate management device 110 or set by the user of the transmission rate management device 110, but the invention should not be limited thereto. In one embodiment, the initial time of the period of time may be 12:00 PM or 12:00 AM, but the invention should not be limited thereto. In another embodiment, the initial time of the period of time may be 8:00 PM or 8:00 AM. In another embodiment, the data traffic allocator 1141 may calculate the another total available data traffic for the next period of time based on the data plan but not based on the sum of remaining available data traffic corresponding to the period of time for the transmission rate management device 110. Similarly, in another embodiment, the data traffic allocator 1141 may calculate the another total available backup data traffic for the next period of time based on the data plan but not based on the sum of remaining available backup data traffic corresponding to the period of time for the transmission rate management device 110.

According to an embodiment of the invention, the data traffic monitor 1142 may monitor if a connection status of client device(s) is changed, for example, a new client device is connected to the transmission rate management device 110, or a client device originally connected to the transmission rate management device 110 is disconnected from the transmission rate management device 110. If the data traffic monitor 1142 detects the connection status of client device (s) is changed, it may send a third monitoring result to the data traffic allocator 1141. Based on the third monitoring result, the data traffic allocator 1141 may re-calculate an updated total available data traffic corresponding to the period of time according to a sum of remaining data traffic of the one or more client devices originally connected to the transmission rate management device 110. Then, the data traffic allocator 1141 may re-allocate one updated available data traffic corresponding to the period of time to the client devices which are currently connected to the transmission rate management device 110 based on the updated total available data traffic, as the allocating described above. For example, the total available data traffic corresponding to the period of time is 3 GB per day, the first client device 120 is connected to the transmission rate management device 110 and the first client device 120 has cost 1 GB of available data traffic (i.e. the sum of the remaining available data traffic is 2 GB). Therefore, when the second client device 130 is connected to the transmission rate management device 110, the data traffic allocator 1141 may re-calculate an updated total available data traffic (i.e. 2 GB), and then the data traffic allocator 1141 may re-allocate 1 GB of updated total available data traffic to the first client device 120 and re-allocate 1 GB of updated total available data traffic to the second client device 130.

According to another embodiment of the invention, the data traffic monitor 1142 may monitor if a connection status of client device(s) is changed, for example, a new client device is connected to the transmission rate management device 110, or a client device originally connected to the transmission rate management device 110 is disconnected from the transmission rate management device 110. If the data traffic monitor 1142 detects the connection status of client device(s) is changed, it may send a third monitoring result to the data traffic allocator 1141. Based on the third monitoring result, the data traffic allocator 1141 may re-calculate an updated total available backup data traffic corresponding to the period of time according to a sum of remaining backup data traffic of the one or more client devices originally connected to the transmission rate management device 110. Then, the data traffic allocator 1141 may re-allocate one updated available backup data traffic corresponding to the period of time to the client devices which are currently connected to the transmission rate management device 110 based on the updated total available backup data traffic. For example, the first client device 120 is connected to the transmission rate management device 110 and it has not use any backup data traffic (i.e. the sum of the remaining available backup data traffic is 0.3 GB) when the second client device 130 is newly connected to the transmission rate management device 110, the data traffic allocator 1141 may re-calculate an updated total available backup data traffic based on the sum of the remaining available backup data traffic (i.e. 0.3 GB) to be 0.3 GB, and then the data traffic allocator 1141 may re-allocate 0.15 GB of updated available backup data traffic to the first client device 120 and re-allocate 0.15 GB of updated available backup data traffic to the second client device 130 based on the updated total available backup data traffic of 0.3 GB. For another example, the first client device 120 is connected to the transmission rate management device 110 and it has run out of the available data traffic and the available backup data traffic corresponding to the period of time when the second client device 130 is newly connected to the transmission rate management device 110, the data traffic allocator 1141 may not allocate any data traffic to any client device since the sum of the remaining available data traffic the sum of the remaining available backup data traffic are both zero.

It should be noted that the above examples are only used to illustrate the embodiments of the invention, but the invention should not be limited thereto.

Figure 2:
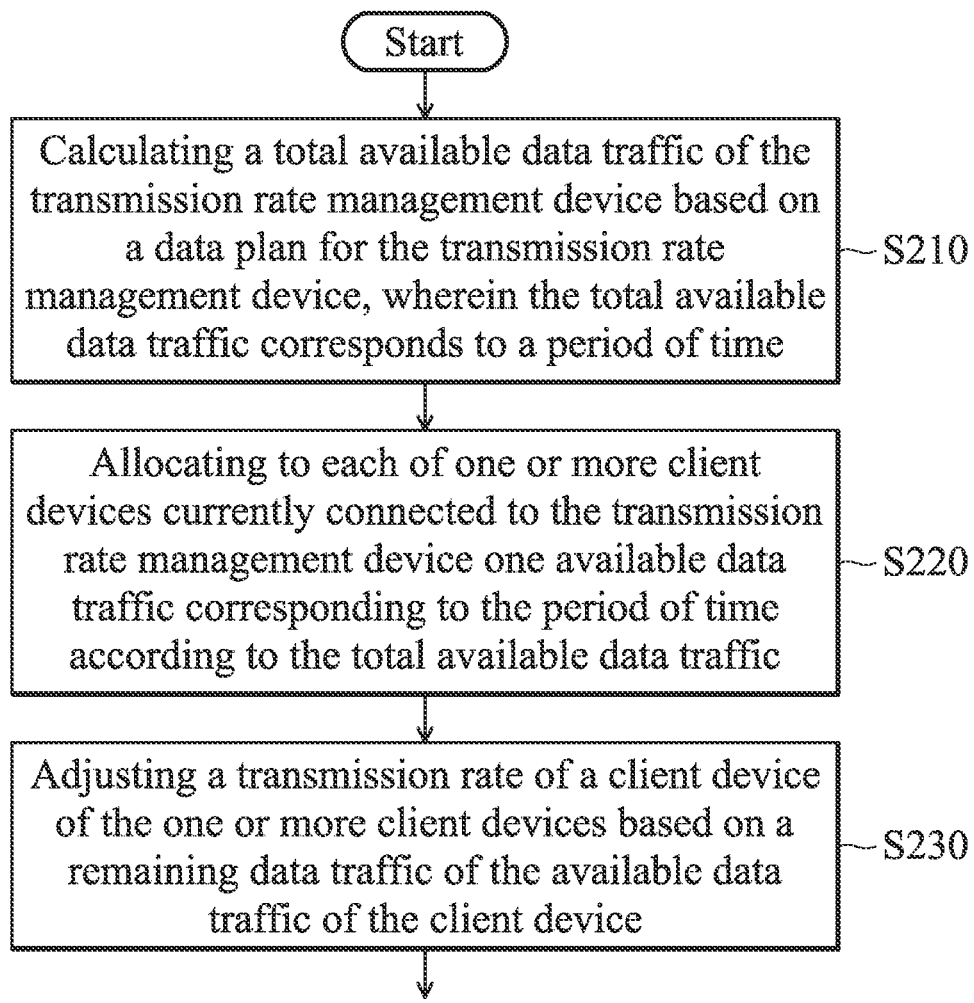
FIG. 2 is a flow chart illustrating a transmission rate management method according to another embodiment of the invention.

FIG. 2 is a flow chart illustrating a transmission rate management method according to an embodiment of the invention. The transmission rate management method can be applied to a transmission rate management device 110 in the transmission rate management system 100. As shown in FIG. 2, in step S210, a data traffic allocator of the transmission rate management device 110 may calculate a total available data traffic of the transmission rate management device based on a data plan for the transmission rate management device, wherein the total available data traffic corresponds to a period of time.

In step S220, the data traffic allocator may allocates to each of one or more client devices currently connected to the transmission rate management device 110 one available data traffic corresponding to the period of time according to the total available data traffic.

In step S230, a transmission rate controller of the transmission rate management device 110 may adjusts a transmission rate of a client device of the one or more client devices based on a remaining data traffic of the available data traffic of the client device.

In some embodiments of the invention, in step S220, the data traffic allocator of the transmission rate management device 110 may allocate to each of the one or more client devices one available data traffic according to the total available data traffic and the number of the one or more client devices.

In some embodiments of the invention, in step S220, the data traffic allocator of the transmission rate management device 110 may allocate to each of the one or more client devices one available data traffic according to the total available data traffic and priorities of the one or more client devices.

In some embodiments of the invention, in step S230, a data traffic monitor of the transmission rate management device 110 may monitor if the client device runs out of its available data traffic and based on a first monitoring result indicating the client device runs out of its available data traffic, the transmission rate management device may limit the transmission rate of the client device according to a first threshold. In some embodiments of the invention, the first threshold is not zero.

In some embodiments of the invention, in the transmission rate management method, the data traffic allocator of the transmission rate management device 110 may further calculate a total available backup data traffic of the transmission rate management device based on the data plan for the transmission rate management device, wherein the total available backup data traffic corresponds to the period of time, and allocate to the each of one or more client devices currently connected to the transmission rate management one available backup data traffic corresponding to the period of time according to the total available backup data traffic. Based on the first monitoring result indicating the client device runs out of its available data traffic, the transmission rate controller of the transmission rate management device 110 may adjust the transmission rate of the client device based on a remaining backup data traffic of the available backup data traffic of the client device. In some embodiments of the invention, based on the first monitoring result indicating the client device runs out of its available data traffic, the data traffic monitor of the transmission rate management device 110 may monitor if the client device runs out of its available backup data traffic. Based on a second monitoring result indicating the client device runs out of its available backup data traffic, the transmission rate controller of the transmission rate management device 110 may limit the transmission rate of the client device according to a second threshold, wherein the second threshold is lower than the first threshold.

In some embodiments of the invention, in the transmission rate management method, the data traffic monitor of the transmission rate management device 110 may monitor if a connection status of the one or more client devices changes during the period of time. Based on a third monitoring result indicating the connection status of the one or more client devices change, the data traffic allocator of the transmission rate management device 110 may re-calculate an updated total available data traffic corresponding to the period of time of the transmission rate management device according to a sum of remaining data traffic of the available data traffic of the one or more client devices and re-allocate to each client device currently connected to the transmission rate management device one updated available data traffic corresponding to the period of time according to the updated total available data traffic.

In some embodiments of the invention, in the transmission rate management method, the data traffic monitor of the transmission rate management device 110 may monitor if a connection status of the one or more client devices change during the period of time. Based on a third monitoring result indicating the connection status of the one or more client devices change, the data traffic allocator of the transmission rate management device 110 may re-calculate an updated total available backup data traffic corresponding to the period of time of the transmission rate management device according to a sum of remaining backup data traffic of the available backup data traffic of the one or more client devices and re-allocate to each client device currently connected to the transmission rate management device one updated available backup data traffic corresponding to the period of time according to the updated total available backup data traffic.

In some embodiments of the invention, in the transmission rate management method, the data traffic allocator of the transmission rate management device 110 may calculate another total available data traffic corresponding to the next period of time of the transmission rate management device based on the data plan for the transmission rate management device and a sum of remaining data traffic of data traffic of the one or more client devices in the period of time.

In the transmission rate management method of the invention, the transmission rate management device may allocate the daily data traffic to the client devices based on the based on a data plan for the data traffic and the number of client device. In addition, the transmission rate management device may adjust the transmission rate of each client devices based on the remaining daily data traffic. Therefore, the transmission rate management method may provide a more flexible solution for allocating data traffic and transmission rate.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A transmission rate management method, applied to a transmission rate management device, comprising:
   calculating a total available data traffic of the transmission rate management device based on a data plan for the transmission rate management device, wherein the total available data traffic corresponds to a period of time;
   allocating to each of one or more client devices currently connected to the transmission rate management device one available data traffic corresponding to the period of time according to the total available data traffic;
   adjusting a transmission rate of a client device of the one or more client devices based on a remaining data traffic of the available data traffic of the client device;
   monitoring if a connection status of the one or more client devices change during the period of time;
   based on a third monitoring result indicating the connection status of the one or more client devices change, re-calculating an updated total available data traffic corresponding to the period of time of the transmission rate management device according to a sum of remaining data traffic of the available data traffic of the one or more client devices; and
   re-allocating to each client device currently connected to the transmission rate management device one updated available data traffic corresponding to the period of time according to the updated total available data traffic.

2. The transmission rate management method of claim 1, wherein the step of allocating to each of one or more client devices currently connected to the transmission rate management device one available data traffic corresponding to the period of time according to the total available data traffic further comprises:
   allocating to each of the one or more client devices one available data traffic according to the total available data traffic and the number of the one or more client devices.

3. The transmission rate management method of claim 1, wherein the step of allocating to each of one or more client devices currently connected to the transmission rate management device one available data traffic corresponding to the period of time according to the total available data traffic further comprises:
   allocating to each of the one or more client devices one available data traffic according to the total available data traffic and priorities of the one or more client devices.

4. The transmission rate management method of claim 1, wherein the step of adjusting the transmission rate of the client device of the one or more client devices based on the remaining data traffic of the available data traffic of the client device further comprises:
   monitoring if the client device runs out of its available data traffic; and
   based on a first monitoring result indicating the client device runs out of its available data traffic, limiting the transmission rate of the client device according to a first threshold.

5. The transmission rate management method of claim 4, wherein the first threshold is not zero.

6. The transmission rate management method of claim 5, further comprising:
   calculating a total available backup data traffic of the transmission rate management device based on the data plan for the transmission rate management device, wherein the total available backup data traffic corresponds to the period of time;
   allocating to the each of one or more client devices currently connected to the transmission rate management one available backup data traffic corresponding to the period of time according to the total available backup data traffic; and
   based on the first monitoring result indicating the client device runs out of its available data traffic, adjusting the transmission rate of the client device based on a remaining backup data traffic of the available backup data traffic of the client device.

7. The transmission rate management method of claim 6, wherein the step of based on the first monitoring result indicating the client device runs out of its available data traffic, adjusting the transmission rate of the client device based on the remaining backup data traffic of the available backup data traffic of the client device includes:
   based on the first monitoring result indicating the client device runs out of its available data traffic, monitoring if the client device runs out of its available backup data traffic; and
   based on a second monitoring result indicating the client device runs out of its available backup data traffic, limiting the transmission rate of the client device according to a second threshold, wherein the second threshold is lower than the first threshold.

8. The transmission rate management method of claim 6, further comprising:
   monitoring if a connection status of the one or more client devices change during the period of time;
   based on a third monitoring result indicating the connection status of the one or more client devices change, re-calculating an updated total available backup data traffic corresponding to the period of time of the transmission rate management device according to a sum of remaining backup data traffic of the available backup data traffic of the one or more client devices; and
   re-allocating to each client device currently connected to the transmission rate management device one updated available backup data traffic corresponding to the period of time according to the updated total available backup data traffic.

9. The transmission rate management method of claim 1, further comprising:
   calculating another total available data traffic corresponding to the next period of time of the transmission rate management device based on the data plan for the transmission rate management device and a sum of remaining data traffic of data traffic of the one or more client devices in the period of time.

10. A transmission rate management device, comprising:
    a data traffic allocator, calculating a total available data traffic of the transmission rate management device based on a data plan for the transmission rate management device, wherein the total available data traffic corresponds to a period of time, and allocating to each of one or more client devices currently connected to the transmission rate management device one available data traffic corresponding to the period of time according to the total available data traffic;

a transmission rate controller, coupled to the data traffic allocator and adjusting a transmission rate of each client device based on remaining data traffic of each client device; and a data traffic monitor, coupled to the data traffic allocator, wherein the data traffic monitor monitors if a connection status of the one or more client devices change during the period of time and based on a third monitoring result indicating the connection status of the one or more client devices change, the data traffic allocator re-calculates an updated total available data traffic corresponding to the period of time of the transmission rate management device according to a sum of remaining data traffic of the available data traffic of the one or more client devices, and re-allocates to each client device currently connected to the transmission rate management device one updated available data traffic corresponding to the period of time according to the updated total available data traffic.

11. The transmission rate management device of claim 10, wherein the data traffic allocator allocates to each of the one or more client devices one available data traffic according to the total available data traffic and the number of the one or more client devices.

12. The transmission rate management device of claim 10, wherein the data traffic allocator allocates to each of the one or more client devices one available data traffic according to the total available data traffic and priorities of the one or more client devices.

13. The transmission rate management device of claim 10, further comprising:

a data traffic monitor, coupled to the data traffic allocator, wherein the data traffic monitor monitors if the client device runs out of its available data traffic and based on a first monitoring result indicating the client device runs out of its available data traffic, the transmission rate controller limits the transmission rate of the client device according to a first threshold.

14. The transmission rate management device of claim 13, wherein the first threshold is not zero.

15. The transmission rate management device of claim 14, wherein the data traffic allocator calculates a total available backup data traffic of the transmission rate management device based on the data plan for the transmission rate management device, wherein the total available backup data traffic corresponds to the period of time, and allocates to the each of one or more client devices currently connected to the transmission rate management one available backup data traffic corresponding to the period of time according to the total available backup data traffic, and based on the first monitoring result indicating the client device runs out of its available data traffic, the transmission rate controller adjusts the transmission rate of the client device based on a remaining backup data traffic of the available backup data traffic of the client device.

16. The transmission rate management device of claim 15, wherein based on the first monitoring result indicating the client device runs out of its available data traffic, the data traffic monitor monitors if the client device runs out of its available backup data traffic and based on a second monitoring result indicating the client device runs out of its available backup data traffic, the transmission rate controller limits the transmission rate of the client device according to a second threshold, wherein the second threshold is lower than the first threshold.

17. The transmission rate management device of claim 15, wherein the data traffic monitor monitors if a connection status of the one or more client devices change during the period of time, and based on a third monitoring result indicating the connection status of the one or more client devices change, the data traffic allocator re-calculates an updated total available backup data traffic corresponding to the period of time of the transmission rate management device according to a sum of remaining backup data traffic of the available backup data traffic of the one or more client devices based on a third monitoring result indicating the connection status of the one or more client devices change and re-allocates to each client device currently connected to the transmission rate management device one updated available backup data traffic corresponding to the period of time according to the updated total available backup data traffic.

18. The transmission rate management device of claim 10, wherein the data traffic allocator calculates another total available data traffic corresponding to the next period of time of the transmission rate management device based on the data plan for the transmission rate management device and a sum of remaining data traffic of data traffic of the one or more client devices in the period of time.

* * * * *